Sept. 19, 1961  N. N. LAREAU ET AL  3,000,313
DELAYED ARMING SELF-DESTRUCTION TYPE FUZE
Filed July 2, 1956  7 Sheets-Sheet 1

Norman N. Lareau
Paul J. Ernisse
INVENTORS

BY
ATTORNEYS

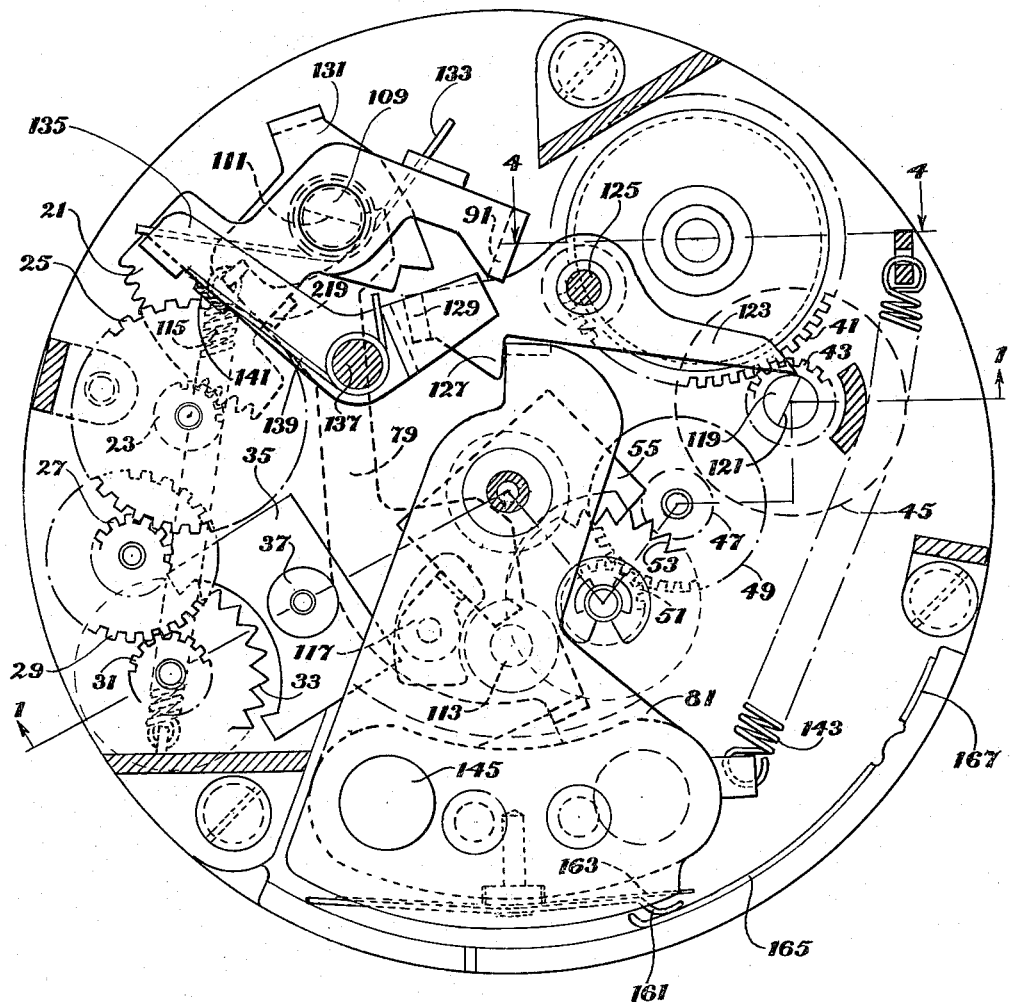

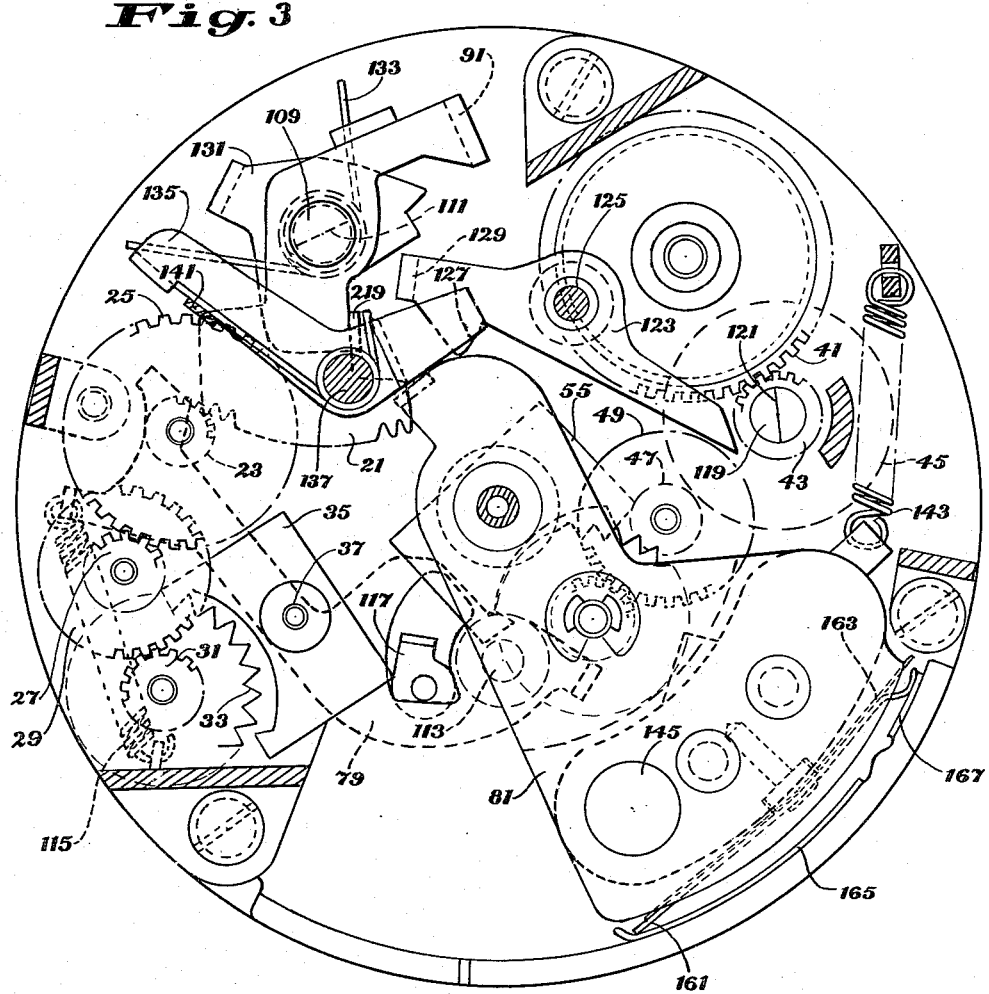

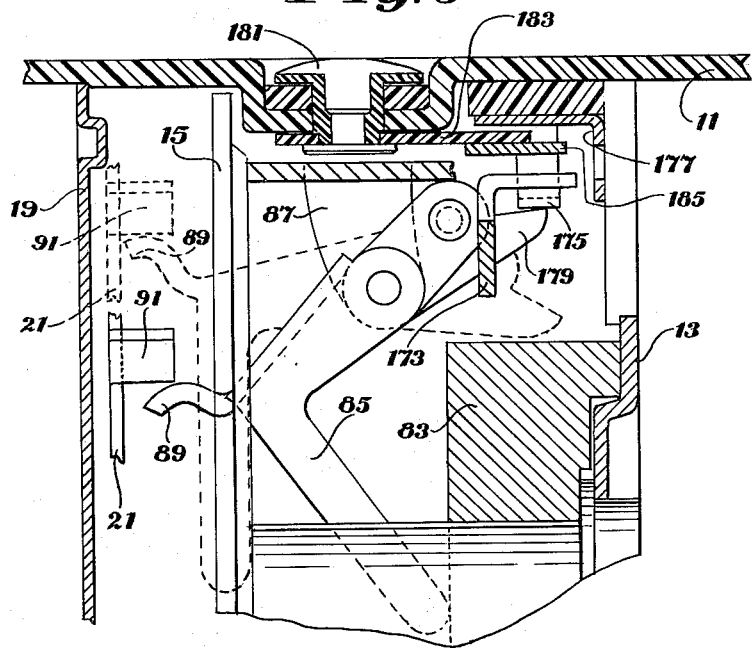
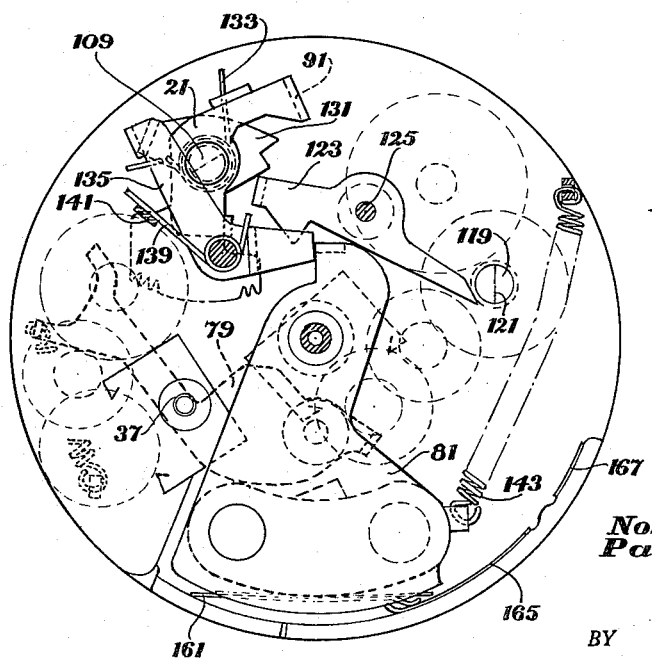

Sept. 19, 1961   N. N. LAREAU ET AL   3,000,313
DELAYED ARMING SELF-DESTRUCTION TYPE FUZE
Filed July 2, 1956   7 Sheets-Sheet 5

Norman N. Lareau
Paul J. Ernisse
INVENTORS

BY
ATTORNEYS

Norman N. Lareau
Paul J. Ernisse
INVENTORS

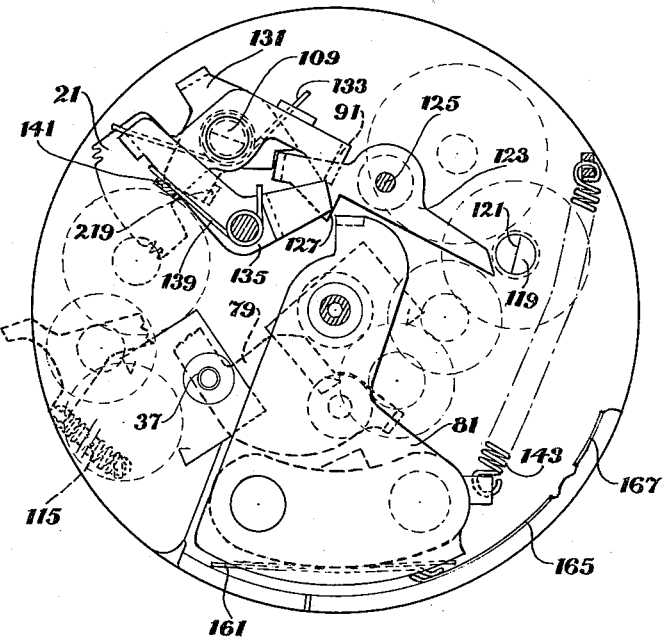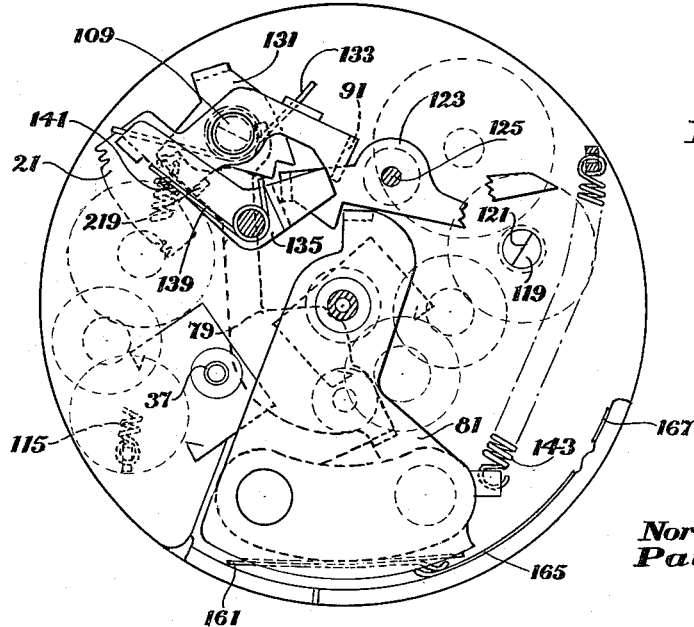

3,000,313
DELAYED ARMING SELF-DESTRUCTION TYPE FUZE

Norman N. Lareau and Paul J. Ernisse, Rochester, N.Y., assignors, by mesne assignments, to the United States of America as represented by the Secretary of the Navy
Filed July 2, 1956, Ser. No. 595,567
8 Claims. (Cl. 102—70.2)

This invention relates to fuzes and more particularly to an air to air delayed arming type self-destruction proximity fuze.

Experience with the known proximity fuzes emphasized the need for a fuze which would provide safe handling, transporting and firing of a proximity fuze initiated rocket. It was this need which prompted the design of the hereinafter described invention.

Upon launching of a missile equipped with our fuze, a weight is actuated as a result of the missile acceleration and drives a gear train which serves to integrate time as a function of the acceleration. The elapsing time interval assures that the missile fuze is armed only after traveling a safe distance from the point of launching. The fuze is provided with an impact type switch for detonating the missile upon a graze type impact of the missile with another object. Self-destruction of the missile is occasioned by a clock type gear train which operates for a given length of time before closing a switch causing detonation.

The primary object of the present invention is, therefore, to provide a fuze which is safe to handle under all conditions.

Another object of the present invention is to provide a fuze which arms at a safe distance from the point of launching.

Still another object of the present invention is to provide a fuze having a time regulated firing pin that is capable of actuating the switch for the electric power supply in the missile.

Yet another object of the present invention is to provide a fuze which will cause detonation of a missile as a result of a graze type of impact of the missile with another object.

Still another object of the present invention is to provide a fuze having a fixed time self-destruction device.

Other objects and advantages of the present invention will become readily apparent to those skilled in the art from the following description with reference to the drawings in which like characters denote like parts and wherein:

FIG. 2 and FIG. 3 are plan views of the fuze according to our invention;

FIG. 5 is a cross sectional view taken along line 5—5 of FIG. 7 and illustrating the two operating positions of the sector operating lever as determined by the action of the fuze weight according to our invention;

FIG. 10, FIG. 11 and FIG. 12 are plan views similar to FIGS. 2 and 3 but illustrating the operation of several safety features included in the fuze according to our invention.

Figure 1:
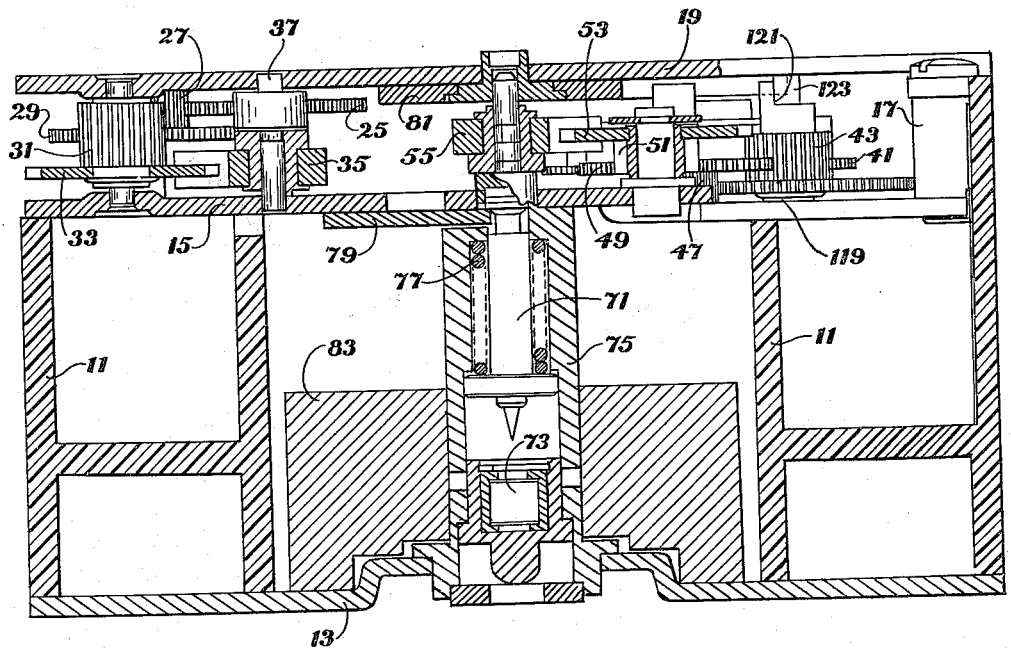
FIG. 1 is a cross sectional view taken along line 1—1 of FIG. 2 illustrating some of the mechanical parts of the fuze according to our invention.
Figure 4:
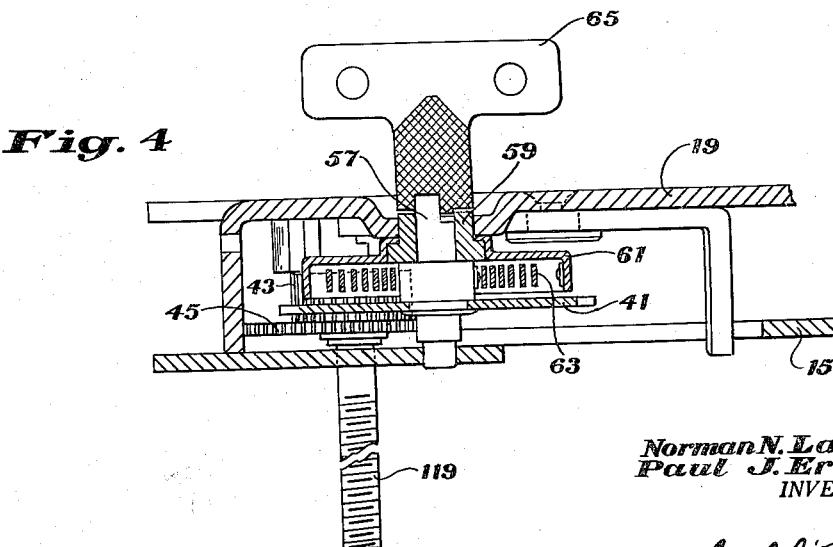
FIG. 4 is a cross sectional view taken along line 4—4 of FIG. 2 and illustrating the self-destruction motor for the fuze.

As illustrated in FIG. 1, the fuze comprises a hollow insulator block 11 formed from a suitable plastic material. Block 11 carries on the front end thereof a front mechanism plate 13. This end of the fuze is designated the front end throughout this specification because it lies nearest to the nose of the missile, not shown, in which it is installed. Similarly, the other end of the block 11 carries the center mechanism plate 15 and supported therefrom by means of spacers 17, a rear mechanism plate 19. As illustrated in FIG. 2, a gear train for integrating time as a function of acceleration and providing a time interval after launching of the missile before permitting the arming thereof is positioned between the center and rear mechanism plates 15 and 19 respectively, and comprises sector 21, pinion 23 and gear 25 mounted together as a unit, pinion 27 and gear 29 mounted together as a unit, pinion 31 and star wheel 33 mounted together as a unit, and pallet 35, which is mounted on pallet stud 37. Also positioned between the center and rear mechanism plates 15 and 19 respectively, is the clock type gear train which after a sufficient time interval closes a switch resulting in the self-destruction of the missile. This gear train comprises a spring motor which is connected to and drives gear 41, a pinion, 43 and a gear 45 mounted together as a unit, a pinion 47 and a gear 49 mounted together as a unit, a pinion 51 and a star wheel 53 mounted together as a unit, and a pallet 55. The spring motor which drives gear 41 is best illustrated in FIG. 4.

Gear 41 is rigidly mounted on the motor arbor 57, which is pivotally supported in center mechanism plate 15 and in a bushing 59 fixedly mounted in a rear mechanism plate 19. Bushing 59 retains spring motor barrel 61 in fixed nonrotatable relation on the rear mechanism plate 19. The motor spring 63 is fixed on the arbor 57 and to the inner peripheral wall of the barrel 61 whereby the gear 41 may be biased for rotation with respect to the barrel 61 by winding the spring 63 on the arbor 57 prior to the assembly of the fuze in the missile by means of a wrench such as, for example, the wrench 65. It should be understood that wrench 65 does not form a part of the assembled fuze of our invention but is illustrated in FIG. 4 to facilitate the understanding of the operation of our invention.

Figure 7:
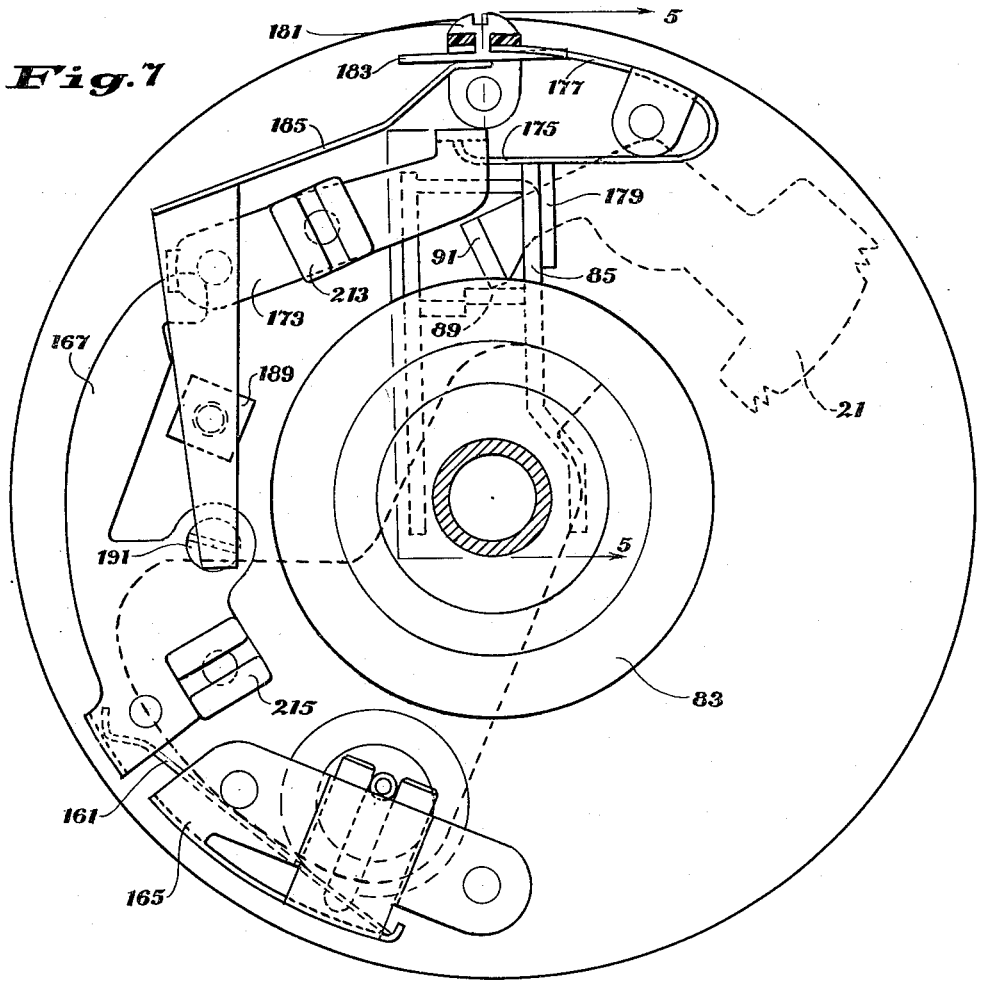

A firing pin 71 is located centrally of the insulator block 11 and in aligned relation to a percussion primer cup 73 assembly, and to a M-42 primer, not shown, which is part of the battery assembly, also not shown. Firing pin 71 is slidably received within the firing pin sleeve 75 and is retained in the upper position indicated in FIG. 1 against the bias of the firing pin spring 77 by means of abutment of a portion of striker latch 79, which protrudes through a slot in the sleeve 75 and engages a reduced shoulder on the firing pin 71. The sleeve 75 has a reduced portion which extends through the center mechanism plate 15 and rotatably carries the pallet 55 and barrier plate 81. A cylindrical weight 83 is concentrically positioned with respect to the sleeve 75 and is slidable longitudinally of the sleeve. The arms of a sector operating lever 85 rest on weight 83 on the opposite sides of sleeve 75. Lever 85 is pivotally supported on a bracket 87 which is formed on a depending portion of center mechanism plate 15. Lever 85 is provided with a cam arm 89 which engages a follower surface 91 on the end of sector 21 as best illustrated in FIG. 5 and FIG 7.

Again referring to FIG. 1 and FIG. 2, sector 21 is rigidly mounted on pivot shaft 109 which extends between the rear and center mechanism plates 19 and 15 respectively, and has a flatted portion 111 which protrudes through the center mechanism plate 15. Flatted portion 111 acts as a release means for striker latch 79 which is mounted on pivot 113 on the center mechanism plate 15.

A striker latch spring 115 biases the striker latch 79 to the position indicated in FIG. 3. Striker latch 79 carries pallet lock spring 117 protruding through an aperture in the center mechanism plate 15 for engagement with pallet 55. Movement of latch 79 thus releases firing pin 71 and pallet 55 as will be hereinafter more fully described. The shaft 119 which carrier pinion 43 and gear 45 is provided with a flatted portion 121 which acts as a release means for the barrier latch 123. Barrier latch 123 is pivotally mounted on a stud 125 and is provided with a nose portion 127 releasably engaging the barrier plate 81. On the end of barrier latch 123 is provided a depending portion 129 for engaging the sector latch 131 which is rotatably mounted on pivot shaft 109 along with sector 21 which is rigidly mounted thereon. A sector return spring 133 is positioned around shaft 109 and engages an upstanding lug on sector 21 and a lug on a safety lever 135, which is pivoted on a stud 137 fixed in the rear mechanism plate 19. A safety lever spring 139, which is weaker than the spring 133 is positioned about stud 137 and engages a block 141 fixed to the plate 19, and also engages the remote end of the safety lever 135 thereby biasing the lever 135 clockwise as viewed in FIG. 2 against the counterclockwise bias of spring 133. The reason for this structure will become apparent from the hereinafter described operation of the fuze. The nose portion 127 on barrier latch 123 engages the barrier plate 81 to restrain the plate from counterclockwise movement as viewed in FIG. 2 by the bias of barrier arming spring 143. This movement of barrier plate 81 puts the pyrotechnic lead 145 in line with the electric detonator 147. As known by those skilled in the art, the pyrotechnic lead serves as a means for securing the detonation of the missile as a result of the detonation of the detonator.

Figure 6:
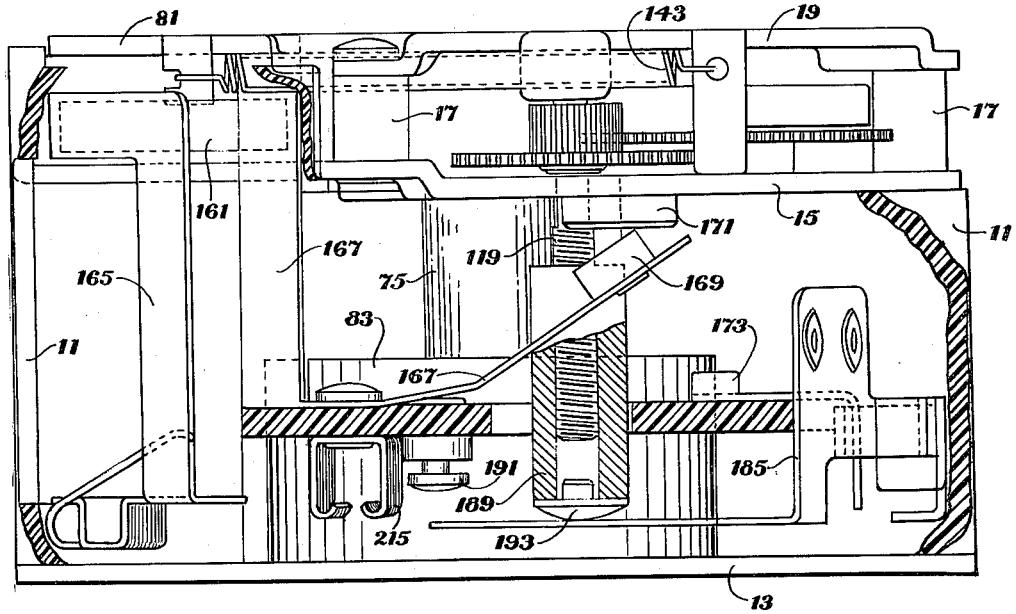
FIGS. 6, 7 and 9 illustrate the series of electrical contacts and the positions thereof in the fuze according to our invention.
Figure 9:
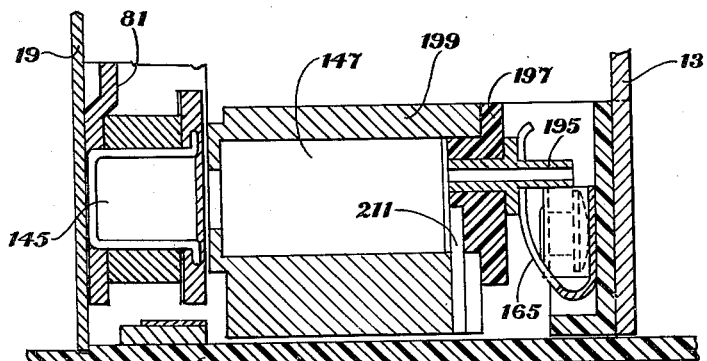

Barrier plate 81 carries on the end thereof a barrier contact 161 which is insulated from the barrier plate 81 by contact insulator 163. Prior to any movement of barrier plate 81 barrier contact 161 is in electrical contact with only the detonator contact 165. After movement of barrier plate, barrier contact 161 makes electrical contact with detonator contact 165 and with a portion of graze contact 167 as best illustrated in FIG. 6 and FIG. 7. Graze contact 167 is provided with a weight 169 for initiating the movement of extending portion of contact 167 upon a graze impact of the missile. The weight 169 which normally rests against the graze switch insulator 171 causes by its inertia the movement of the graze contact 167 into electrical contact with one end of the small self-destruction contact 173. The other end of contact 173 is provided with a lug portion for engaging the flexible arm 175 of the self-destruction and battery contact 177. The arm 175 is pressed into electrical contact with the lug portion of contact 173 by the cam 179 carried by the sector operating lever 85 as best illustrated in FIG. 5. When lever 85 is moved to the dotted position shown in FIG. 5 due to the acceleration of the missile, the natural resiliency of arm 175 breaks the electrical contact with the contact 173 as will be hereinafter more fully explained in the operation of the fuze. As further illustrated in FIG. 5, a screw 181 carrying a plastic cam 183 on the end thereof is provided on the insulator block 11 in order to provide a means for opening the electrical contact between the self-destruction and battery contact 177, and one end of the large self-destruction contact 185. Until contacts 177 and 185 are closed no current from the battery 187 (schematically shown in FIG. 8 only) passes through the circuit. The other end of contact 185 is maintained, by means of the self-destruction switch actuating nut 189, out of electrical contact with connector 191 which is electrically connected to graze contact 167. Nut 189 is provided with an insulator 193 on one end thereof for contact with the contact 185 and is threaded onto the shaft 119. The detonator contact 165 is electrically connected to the detonator 147 through the detonator pin 195 which is inserted into the detonator cap 197 mounted on the detonator housing 199 as best illustrated in FIG. 9. The detonator 147 is grounded to the housing 199 by means of the lead wire 211. Battery connector 213 is electrically connected to and mounted on the small self-destruction contact 173 as illustrated in FIG. 7. A similar connector, pulse connector 215 is electrically connected to and mounted on graze contact 167. These connectors 213 and 215 receive the terminals of the battery 187 and the terminal from the proximity fuze 217 (shown schematically in FIG. 8 only) which produces the pulse for detonating the missile.

Having described the principal mechanical parts of the fuze according to our invention, the disclosure of the operation of the fuse which follows should be readily understood by those skilled in the art. Some time prior to the launching of the missile cam 183 is turned by means of screw 181 to permit contacts 177 and 185 to close. At the instant prior to launching of the missile the parts of the fuze are in the positions indicated in FIG. 1 and FIG. 2. The inertia forces developed during launching propel the weight 83 rearward toward the center mechanism plate 15. This causes sector operating lever 85 to pivot about the pin in bracket 87 and to move the end of sector 21 to the dotted position shown in FIG. 5 which is illustrated in plan view in FIG. 3. The mechanism of the star wheel 33 and pallet 35 offers resistance to the movement of sector 21 and the sector operating lever 85 causing a predetermined time to elapse before the flat 111 on pivot shaft 109 has reached the position where the striker latch 79 is released and is pivoted about pivot 113 by the spring 115. Movement of the striker latch 79 immediately releases the firing pin 71 which strikes and explodes the primer cup assembly 73 which results in the energization of the battery 187 through the action of the M-42 primer and battery assembly, not shown. Movement of the striker latch 79 simultaneously releases the spring 117 from engagement with pallet 55 thereby permitting the self-destruction motor to operate and start driving the star wheel 53. After the self-destruction motor has driven the shaft 119 through pinion 43 to the position where the barrier latch 123 is released by the flat 121, the spring 143 moves the barrier plate 81 and the barrier latch 123 from the positions indicated in FIG. 2 to the positions shown in FIG. 3. This places the pyrotechnic lead 145 immediately adjacent to the detonator 147 and also closes the electrical circuit between the detonator contact 165 and the graze contact 167 through the barrier contact 161 thus arming the fuze. It will now be apparent that the time required for the arming of the fuze is dependent on the movement of weight 83 which is dependent on the acceleration of the missile plus the time required for the motor to rotate the shaft 119 to the position whereat the barrier latch 123 and the barrier plate 81 are released. The elapsing time interval before arming assures that the missile will not be detonated sufficiently close to the point of launching to cause injury to any of the launching personnel.

When the missile begins to decelerate the resulting inertia forces and the bias of spring 133 cause the weight 83, sector operating lever 85 and sector 21 to return to the original positions, indicated in FIG. 2. Movement of the lever 85 and cam 179 operates to close the electrical circuit between self-destruction and battery contact 177 and the small self-destruction contact 173 as best illustrated in FIG. 5.

Figure 8:
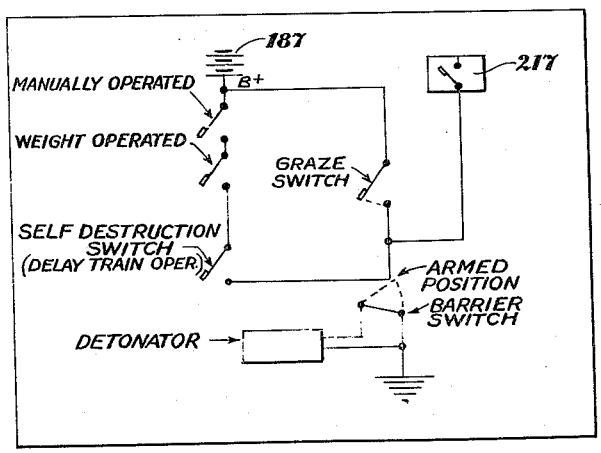
FIG. 8 is a schematic electrical circuit diagram for the operating of the fuze according to our invention.

Referring to FIG. 7 and to the schematic circuit diagram of FIG. 8 it will be understood that at this stage in the operation of the fuze, movement of the barrier contact 161 is indicated by the armed position shown for the barrier switch; the closing of the electrical circuit between the self-destruction and battery contact 177, and the large self-destruction contact 185 is indicated by the closing of the manually operated switch; and the closing of the electrical circuit between the self-destruction and battery contact 177 and the small self-destruction contact 173 by the movement of the weight 83 (FIG. 5) to the forward end of the fuze upon deceleration of the missile, is indicated by the closing of the weight operated switch. It will now be readily apparent that detonation can occur by either the sending of an electrical pulse by the proximity fuze 217 to the detonator; the closing of the graze switch as a result of the graze impact of the missile with an object; or the closing of the self-destruction switch as a result of the continued operation of the self-destruction motor.

In the event that the proximity fuze, shown schematically in FIG. 8 only, functions and produces a pulse, the pulse is transmitted from terminals, not shown, through the pulse connector 215, barrier contact 161 and detonator contact 165 to the detonator 147 thereby causing detonation of the missile.

In the event that the missile should graze an object, the directional deceleration caused by the graze impact would cause the weighted graze contact 167 to move and make electrical contact with the small self-destruction contact 173, closing the electric circuit. Current from the battery 187 would then flow from the battery terminals, not shown, through the battery connector 213, the graze contact 167, the barrier contact 161 and the detonator contact 165 to the detonator 147 causing detonation of the missile.

In the event that the missile suffers no graze impact and no pulse is received from the proximity fuze 217 the self-destruction motor continues to drive the shaft 119 through the gear 43 and pinion 41 which causes the nut 189 to be screwed further onto shaft 119 until the large self-destruction contact 185 makes electrical contact with the connector 191. Current from the battery 187 then flows from the battery terminals, not shown, through the battery connector 213, the self-destruction and battery contact 177, the large self-destruction contact 185, the graze contact 167, the barrier contact 161 and detonator contact 165 to the detonator 147 causing detonation and the self-destruction of the missile.

The fuze according to our invention incorporates several important safety features which are further illustrated in FIG. 10, FIG. 11 and FIG. 12. FIG. 10 illustrates what occurs when the sector return spring 133 breaks. When the missile is fired the weight 83 through sector operating lever 85 drives sector 21, and the flatted portion 111 on pivot shaft 109 releases the striker latch 79 thereby simultaneously releasing the firing pin 71 and the self-destruction motor, as was hereinbefore described. With the sector return spring 133 broken, the safety lever spring 139 biases the safety lever 135 clockwise as viewed in FIG. 10. Thus, even though the self-destruction motor drives the shaft 119 to the position permitting release of the barrier latch 123, the barrier plate 81 is not released for movement by the barrier arming spring 143 because the safety lever 135 engages the barrier plate 81, and consequently the fuze cannot become armed and no detonation of the missile can occur.

FIG. 11 illustrates what occurs when the striker latch 79 breaks releasing the firing pin 71 and the self-destruction motor. When the self-destruction motor has driven the shaft 119 to the position permitting release of the barrier latch 123 the remote end of the barrier latch 123 is engaged by the sector latch 131 prohibiting any further movement of barrier latch 123 and, therefore, preventing the nose 127 of barrier latch 123 from releasing barrier plate 81 and thereby preventing the fuze from detonating the missile. Even if the striker latch 79 were broken some time prior to launching of the missile, the same result is obtained because the center to center distance between pivot shaft 109 and stud 125 is less than the distance between the center of pivot shaft 109 to the point of engagement of the sector latch 131 and the barrier latch 123 plus the distance from said point of engagement to the center of stud 125. This interference prevents any further movement of sector 21 which is restrained by lug 219 on latch 131 and prohibits any further movement of the barrier latch 123.

In FIG. 12 we have illustrated what occurs in the event that the barrier latch 123 breaks. This would normally result in the releasing of the barrier plate 81 except for the presence of the sector latch 131 which engages the remote end of the barrier latch 123 and prevents any further movement of the barrier latch 123 or sector 21 in the same manner as was hereinbefore described with reference to FIG. 11.

Thus, in all of the illustrated instances and in all other cases where the striker latch 79 is prematurely or accidentally released and the fuze is prevented from arming, the missile will not be detonated; the missile will be a "dud" both electrically as well as mechanically. Should any defect develop in the clock-type, self-destruction gear train whereby shaft 119 closes the electrical circuit between the large self-destruction contact 185 and the connector 191 prior to launching of the missile, the barrier latch 123 will be arrested by the sector latch 131 as was previously described with reference to FIG. 11. Should any defect occur in the delayed arming gear train whereby the sector 21 is actuated without benefit of a delayed time interval, the striker latch 79 releases the firing pin 71 and the self-destruction motor, the sector 21 returns to the original position without delay and movement of the barrier plate 81 is prevented by the engagement of the barrier latch 123 with the sector latch 131 as was previously described with reference to FIG. 11.

In the event that the fuze equipped missile is dropped during transport, the fuze does not detonate the missile. Under such circumstances the weight 83 may receive a jolt which tends to move the weight 83 toward the rear of the missile, but because the forces developed as a result of the decelerating effect upon impact of the dropped missile are of such a short duration, the weight is not moved a sufficient distance against the action of the star wheel 33 and pallet 35 to permit striker latch 79 to be released by the shaft 109, and the force of the sector return spring 133 returns the parts including the weight to the normal nonactuated positions as illustrated in FIG. 1 and FIG. 2.

It will now be appreciated by those skilled in the art that we have provided a fuze which is safe to handle under all conditions, which is armed only after traveling a safe distance from the point of launching, that has a time-regulated firing pin capable of actuating the electric power supply in the missile, that causes detonation of the missile on a graze impact with another object, and that has a fixed time, self-destruction device.

While we have disclosed only one embodiment of the present invention it is realized that many modifications are possible and will become readily apparent to those skilled in the art, and, therefore, the description is intended to be illustrative only and the scope of the invention is defined in the appended claims.

Having now particularly described our invention, what we desire to secure by Letters Patent of the United States and what we claim is:

1. A fuze for a missile comprising a detonator connectable to a source of electric power through an electric circuit, inertia means movable in response to the forces of acceleration developed during launching of the missile, a time delay mechanism actuatable by the movement of said inertia means through a predetermined distance for energizing said source, time delay means initiated by said time delay mechanism after movement of said inertia means through said predetermined distance, said time delay means closing after a predetermined period of time after actuation, an arming switch for electrically connecting said detonator in said circuit and thereby arming said fuze, a small inertia means movable in response to the forces of deceleration developed as a result of a graze impact of the missile with an object, a normally open graze switch fixed to and actuatable by said small inertia means through a predetermined distance to a closed position for electrically closing said circuit to said detonator and causing the detonation of said missile, and a normally open self-destruction switch connected in parallel with said graze switch and in said circuit, said time delay means closing said self-destruction switch after a predetermined period of time after the closing of said arming switch and thereby electrically closing said circuit to said detonator and causing the self-destruction of said missile.

2. A fuze in accordance with claim 1 wherein said time delay mechanism comprises means for controlling and limiting the rate of movement of said inertia means, means interconnecting said inertia means and said controlling and limiting means for movement in response to the movement of said inertia means, and release means carried by said time delay means for releasing and closing said arming switch thereby electrically connecting said detonator in said circuit.

3. A fuse in accordance with claim 2 and including a timing shaft mounted for rotation within said fuze and rotatably driven by said time delay means, and wherein said release means comprises a barrier latch normally retained in a first position by said shaft and against the bias of a tension spring, and a flatted portion provided on said shaft whereby after a predetermined rotational movement thereof said barrier latch is released by said shaft and moved to a second position by said spring for closing said arming switch and electrically connecting said detonator in said circuit.

4. A fuze in accordance with claim 3 wherein said time delay means comprises a spring wound motor for engaging and driving said timing shaft, means driven by said motor for controlling the rate of rotation of said motor, and means carried on said timing shaft for engaging said self-destruction switch and after a predetermined period of time permitting said self-destruction switch to move to a closed position electrically completing said circuit to said detonator.

5. A fuze in accordance with claim 1 wherein said time delay means comprises rotating means for engaging and driving a timing shaft, and means carried on said timing shaft for engaging said self-destruction switch and permitting said self-destruction switch after a predetermined period of time to move to a closed position electrically completing said circuit to said detonator.

6. A fuze in accordance with claim 5 wherein said rotating means comprises a spring wound motor, means driven by said motor for controlling the rate of rotation of said motor, and wherein said timing shaft is screw threaded for engagement with contact means engaging said self-destruction switch, movement of said contact means with respect to said timing shaft permitting said self-destruction switch to move to a closed position electrically completing said circuit to said detonator.

7. A time delay mechanism for arming a missile fuze comprising a detonator connectable to a source of electric power through an electric circuit, inertia means movable in response to the acceleration forces developed during launching of the missile, means for controlling and limiting the rate of movement of said inertia means, and means interconnecting said inertia means and said controlling and limiting means for driving said controlling and limiting means in response to the movement of said inertia means, said interconnecting means including switch means effective after movement of said inertia means through a predetermined distance for energizing said source, time delay means initiated by said switch means simultaneously with the energization of said source, and release means carried by said time delay means closing after a predetermined period of time an arming switch to electrically connect said detonator in said circuit and thereby arm said fuze.

8. A time delay mechanism in accordance with claim 7 and including a timing shaft mounted for rotation within said fuze and wherein said time delay means comprises means for rotatably driving said shaft, and wherein said release means comprises a barrier latch normally retained in a first position by said shaft and against the bias of a tension spring, and a flatted portion provided on said shaft whereby after a predetermined rotational movement thereof said barrier latch is released by said shaft and moved to a second position by said spring for closing said arming switch and electrically connecting said detonator in said circuit.

No references cited.